United States Patent
Fan et al.

(10) Patent No.: US 9,007,032 B2
(45) Date of Patent: Apr. 14, 2015

(54) CONTROL METHOD FOR CHARGING TERMINAL AND APPARATUS THEREOF

(75) Inventors: Zhifeng Fan, Shenzhen (CN); Jingmei Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 159 days.

(21) Appl. No.: 13/574,860

(22) PCT Filed: Jan. 7, 2011

(86) PCT No.: PCT/CN2011/070095
§ 371 (c)(1),
(2), (4) Date: Jul. 24, 2012

(87) PCT Pub. No.: WO2012/048536
PCT Pub. Date: Apr. 19, 2012

(65) Prior Publication Data
US 2012/0293135 A1   Nov. 22, 2012

(30) Foreign Application Priority Data
Oct. 14, 2010   (CN) .......................... 2010 1 0508278

(51) Int. Cl.
 H02J 7/00   (2006.01)
 H01M 10/44  (2006.01)
(52) U.S. Cl.
 CPC ............. H01M 10/44 (2013.01); H02J 7/0068 (2013.01)
(58) Field of Classification Search
 CPC ..................................................... H02J 7/0068
 See application file for complete search history.

(56) References Cited

U.S. PATENT DOCUMENTS

| 5,519,302 A | 5/1996 | Mino |
| 5,576,611 A | 11/1996 | Yoshida |
| 5,648,715 A | 7/1997 | Patino et al. |
| 7,411,372 B2 * | 8/2008 | Cho .............................. 320/141 |
| 2004/0034805 A1 | 2/2004 | Chuang et al. |

(Continued)

FOREIGN PATENT DOCUMENTS

| CN | 1103211 A | 5/1995 |
| CN | 2476129 Y | 2/2002 |

(Continued)

OTHER PUBLICATIONS

International Search Report in international application No. PCT/CN2011/070095, mailed on Jun. 9, 2011.

(Continued)

*Primary Examiner* — Drew A Dunn
*Assistant Examiner* — Steve T Chung
(74) *Attorney, Agent, or Firm* — Oppedahl Patent Law Firm LLC

(57) ABSTRACT

The present disclosure provides a control method for charging a terminal and an apparatus thereof. The method includes steps of: judging whether the terminal is in an operation state or a standby state when the terminal is in a full-charged state (101); controlling a charging circuit of the terminal to be in a switching-on state when the terminal is in the operation state (102); and controlling the charging circuit of the terminal to be in a switching-off state when the terminal is in the standby state. With the control of switching-on or switching-off of the charging circuit based on the states of the terminal, the service life of the terminal is prolonged, a heat emission phenomenon caused by long-time charging of the terminal is avoided, and the charging safety of the terminal is ensured.

12 Claims, 2 Drawing Sheets

(56) References Cited

U.S. PATENT DOCUMENTS

| | | |
|---|---|---|
| 2004/0130293 A1 | 7/2004 | Cho |
| 2006/0025105 A1 | 2/2006 | Sato |
| 2007/0232256 A1 | 10/2007 | Sato |
| 2007/0293278 A1 | 12/2007 | Chuang et al. |
| 2008/0034233 A1 | 2/2008 | Chuang et al. |
| 2008/0122518 A1* | 5/2008 | Besser et al. ............ 327/518 |
| 2010/0240412 A1 | 9/2010 | Chuang et al. |
| 2011/0254511 A1* | 10/2011 | Tam ............................ 320/162 |

FOREIGN PATENT DOCUMENTS

| | | |
|---|---|---|
| CN | 1858963 A | 11/2006 |
| CN | 101651356 A | 2/2010 |
| EP | 1622345 A1 | 2/2006 |
| GB | 2292051 A | 2/1996 |

OTHER PUBLICATIONS

English Translation of the Written Opinion of the International Search Authority in international application No. PCT/CN2011/070095, mailed on Jun. 9, 2011.

Supplementary European Search Report in European application No. 11831933.4, mailed on Sep. 23, 2014. (7 pages—see entire document).

* cited by examiner

CONTROL METHOD FOR CHARGING TERMINAL AND APPARATUS THEREOF

RELATED APPLICATIONS

This application is a nationalization under 35 U.S.C. §371 from International Application Serial No. PCT/CN2011070095, filed Jan. 7, 2011 and published as WO 2012/048536 A1on Apr. 19, 2012, which claims benefit of priority under 35 U.S.C. Section 119 to Chinese Application No. 201010508278.1 filed on Oct. 14, 2010; which applications and publication are incorporated herein by reference in their entirety.

TECHNICAL FIELD

The present disclosure relates to a communication technology, in particular to a control method for charging a terminal and an apparatus thereof.

BACKGROUND

Currently, a terminal (such as a mobile phone) is charged by the following two charging modes: î ED after the terminal is full charged, a charging current path is switched off; and 2̂ after the terminal is full charged, a battery inside the terminal is subjected to trickle charge, and when the voltage of the battery inside the terminal is reduced to a preset voltage threshold value, the secondary charging is started. The preset voltage threshold value is in the range of 4 to 4.1V.

If the above two charging modes are applied, a terminal is more likely to have the following problems when it has been in a charging state for a long time: in the charging mode 1̂, although a charging current is cut off after charging is completed, the terminal cannot be continuously charged when the terminal carries out a service with high power consumption, the electrical energy of the battery of the terminal is rapidly lost and a charging interval is shortened; and in the charging mode 2̂, after the charging is completed, a charging circuit cannot be normally switched off and the terminal would be kept in the charging state for a long time, thereby causing the heating of the terminal body, resulting in an energy waste, even generating a potential safety hazard.

By applying the two charging modes to a terminal, the service life of a battery inside the terminal is shortened and the user experience is influenced.

SUMMARY

Therefore, the present disclosure aims to provide a control method for charging a terminal and an apparatus thereof, prolong the service life of the terminal, prevent the energy waste and ensure the charging safety of the terminal.

To solve the technical problems, the technical solution of the present disclosure is realized as follows.

A control method for charging a terminal, including steps of: judging whether the terminal is in an operation state or a standby state when the terminal is in a full-charged state; controlling a charging circuit of the terminal to be in a switching-on state when the terminal is in the operation state; and controlling the charging circuit of the terminal to be in a switching-off state when the terminal is in the standby state.

The operation state of the terminal may include one or a plurality of the following states: a game operation state, a telephone communication state, an Internet surfing operation state and a short message operation state.

The step of controlling a charging circuit of the terminal to be in a switching-on state when the terminal is in the operation state may be: when the terminal is in the operation state, generating a charging circuit switching-on command and controlling the charging circuit of the terminal to be in the switching-on state according to the charging circuit switching-on command.

The step of controlling the charging circuit of the terminal to be in a switching-off state when the terminal is in the standby state may be: when the terminal is in the standby state, generating a charging circuit switching-off command and controlling the charging circuit of the terminal to be in the switching-off state according to the charging circuit switching-off command.

The step of judging whether the terminal is in an operation state or a standby state may be completed by a state marker of each functional module.

A control apparatus for charging a terminal includes:
a judging module configured to judge whether the terminal is in an operation state or a standby state when the terminal is in a full-charged state;
a control module configured to control a charging circuit of the terminal to be in a switching-on state when the terminal is in the operation state; and control the charging circuit of the terminal to be in a switching-off state when the terminal is in the standby state.

The operation state of the terminal may include one or a plurality of the following states: a game operation state, a telephone communication state, an Internet surfing operation state and a short message operation state.

The control module may be further configured to generate a charging circuit switching-on command and control the charging circuit of the terminal to be in the switching-on state according to the charging circuit switching-on command when the terminal is in the operation state.

The control module may be further configured to generate a charging circuit switching-off command and control the charging circuit of the terminal to be in the switching-off state according to the charging circuit switching-off command when the terminal is in the standby state.

The judging module may complete judging whether the terminal is in the operation state or the standby state by a state marker of each functional module.

According to the control method for charging a terminal and the apparatus thereof which are provided by the present disclosure, the switching-on or switching-off of the charging circuit is controlled based on the states of the terminal, therefore, the service life of the terminal is prolonged, a heat emission phenomenon caused by long-time charging of the terminal is avoided, the energy loss is prevented, and the charging safety of the terminal is ensured.

DETAILED DESCRIPTION

The realization of the aims, the functional characteristics and the advantages of the present disclosure are further detailed with reference to the accompanying drawings and embodiments. It should be understood that the specific embodiments described below are only used for illustrating the present disclosure but not intended to limit the present disclosure.

Figure 1:
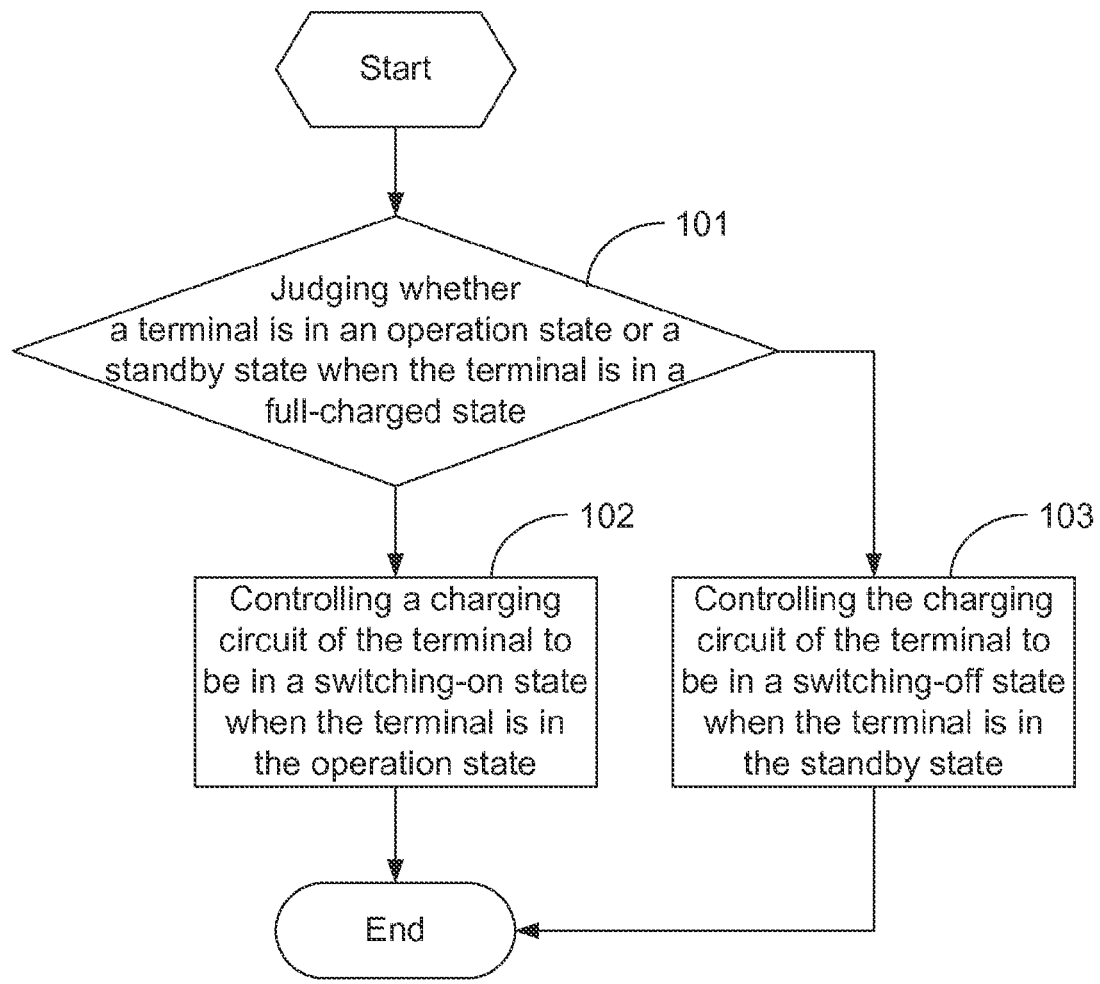
FIG. 1 shows a flowchart of one embodiment of a control method for charging a terminal of the present disclosure.

With reference to FIG. 1, one embodiment of a control method for charging a terminal is disclosed, including:

step 101: judging whether the terminal is in an operation state or a standby state when the terminal is in a full-charged state;

step 102: controlling a charging circuit of the terminal to be in a switching-on state when the terminal is in the operation state; and step 103: controlling the charging circuit of the terminal to be in a switching-off state when the terminal is in the standby state.

The standby state of the terminal refers to that: when the terminal is in a power-on state, no network side services or terminal local services are initiated, and meanwhile, no user operates the terminal. After the terminal enters the standby state for a certain time, the terminal enters a low power consumption mode and an operation current of the terminal is reduced to a low power consumption level and is always kept until the terminal enters the operation state. The network side services are wireless services, generally including: telephone call, short message, Internet surfing, online game, China Mobile Multimedia Broadcasting (CMMB), Global Positioning System (GPS) or the like. The terminal local services generally include: local game, file editing, alarm clock setting or the like. The standby state of the terminal is also called as a power-saving state or a sleep state.

The operation state of the terminal refers to that: when the terminal is in the power-on state, the terminal is triggered to initiate a certain or a plurality of services due to trigger events such as an operation performed by a user on the terminal or a request from a network side, or the like, i.e. a service module is triggered to be started and enters a stable operating state. When the terminal is in the operation state, a Central Processing Unit (CPU) inside the terminal starts to operate and the operating current is large and is commonly dozens to hundreds of times of that in the standby state. The initiated services include wireless services and terminal local services, wherein the wireless services usually include telephone call, short message, Internet surfing, online game, CMMB, GPS or the like; and the terminal local services commonly include local game, file editing, alarm clock setting or the like.

Furthermore, the embodiment of the control method for charging a terminal of the present disclosure also includes the following processing before the step 101: determining that the terminal is connected with a charger, i.e. in the embodiment of the disclosure, the control of switching-on or switching-off of the charging circuit of the terminal according to the current state of the terminal is implemented under the conditions that the terminal is connected with the charger and the charging is completed.

In the embodiment, in a full-charged state of the terminal, when the terminal is determined to be in the operation state, the charging circuit of the terminal is controlled to be in the switching-on state and the charger continues to supply power to the terminal so as to fill up the electric energy consumed due to operation of the terminal, avoid the start of secondary charging caused by rapid power consumption when the terminal is in the operation state, and prolong the service life of a battery of the terminal; and when the terminal is determined to be in the standby state, the charging circuit of the terminal is controlled to be in the switching-off state so as to avoid a heating phenomenon of the terminal, which is generated when the charging circuit is switched on for a long time, and save a great quantity of energy and improve the charging safety of the terminal.

Furthermore, in the embodiment of the control method for charging a terminal of the present disclosure, the operation state of the terminal includes one or a plurality of the following states: a game operation state, a telephone communication state, an Internet surfing operation state and a short message operation state.

The telephone communication state includes an outgoing call connection state, an outgoing call disconnection state, an incoming call connection state and an incoming call disconnection state. The short message operation state includes a short message editing state, a short message sending state, a short message receiving state and a short message reading state.

Furthermore, in the embodiment of the control method for charging a terminal of the present disclosure, the step 102 is: when the terminal is in the operation state, a charging circuit switching-on command is generated and the charging circuit of the terminal is controlled to be in the switching-on state according to the charging circuit switching-on command.

The generated charging circuit switching-on command can be represented by a high level output through an IO port.

Furthermore, in the embodiment of the control method for charging a terminal of the present disclosure, the step 103 is: when the terminal is in the standby state, a charging circuit switching-off command is generated and the charging circuit of the terminal is controlled to be in the switching-off state according to the charging circuit switching-off command.

The generated charging circuit switching-off command can be represented by a low level output through the IO port.

In the embodiment, the step of judging whether the terminal is in an operation state or a standby state can be completed by a state marker of each functional module and specifically can be completed by the following two ways:

1, initializing the state marker of each functional module to "0", then inquiring about a current state of each functional module in the terminal and updating the state marker of each functional module; if a certain functional module is in the operation state, updating the state marker of the functional module to "1"; and if a certain functional module is in an idle state, keeping the state marker of the functional module to "0". If the state marker of one or a plurality of functional modules in the terminal is updated to "1", it represents that the terminal is in the operation state; and if the state markers of all the functional modules are kept "0", it represents that the terminal is in the standby state.

2, starting an interrupt function, initializing markers of all function-interrupt requests to "0", then inquiring about whether the terminal generates interrupt requests and updating the markers of various function-interrupt requests; if a certain function-interrupt request is a service-initiate request, updating the marker of the function-interrupt request to "1"; and if a certain function-interrupt request is a service-closing request, keeping the marker of the function-interrupt request as "0". If the marker of one or a plurality of function-interrupt requests in the interrupt requests is updated to "1", it represents that the terminal is in the operation state; and if the markers of all the function-interrupt requests in the interrupt requests are kept "0" it represents that the terminal is in the standby state.

Figure 2:
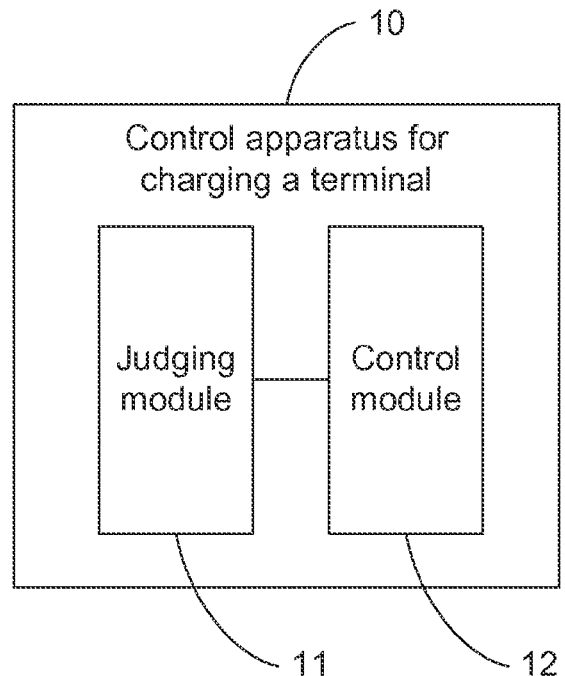
FIG. 2 shows a structural diagram of one embodiment of a control apparatus for charging a terminal of the present disclosure.

With reference to FIG. 2, one embodiment of a control apparatus for charging a terminal is disclosed, including: a judging module 11 and a control module 12, wherein the judging module 11 is configured to judge whether the terminal is in an operation state or in a standby state; and the control module 12 is configured to control a charging circuit of the terminal to be in a switching-on state when the terminal is in the operation state and control the charging circuit of the terminal to be in a switching-off state when the terminal is in the standby state.

The standby state of the terminal refers to that: when the terminal is in a power-on state, no network side services or terminal local services are initiated, and meanwhile, no user operates the terminal. After the terminal enters the standby state for a certain time, the terminal enters a low power consumption mode and an operation current of the terminal is reduced to a low power consumption level and is always kept until the terminal enters the operation state. The network side services are wireless services, commonly including: telephone call, short message, Internet surfing, online game, CMMB, GPS or the like. The terminal local services commonly include local game, file editing, alarm clock setting or the like. The standby state of the terminal is also called as a power-saving state or a sleep state.

The operation state of the terminal refers to that: when the terminal is in the power-on state, the terminal is triggered to initiate a certain or a plurality of services due to trigger events such as an operation performed by a user on the terminal or a request from a network side, or the like, i.e. a service module is triggered to be started and enters a stable operating state. When the terminal is in the operation state, the CPU inside the terminal starts to operate and the operating current is large and is commonly dozens to hundreds of times of that in the standby state. The initiated services include wireless services and terminal local services, wherein the wireless services commonly include: telephone call, short message, Internet surfing, online game, CMMB, GPS or the like; and the terminal local services commonly include: local game, file editing, alarm clock setting, or the like.

Figure 3:
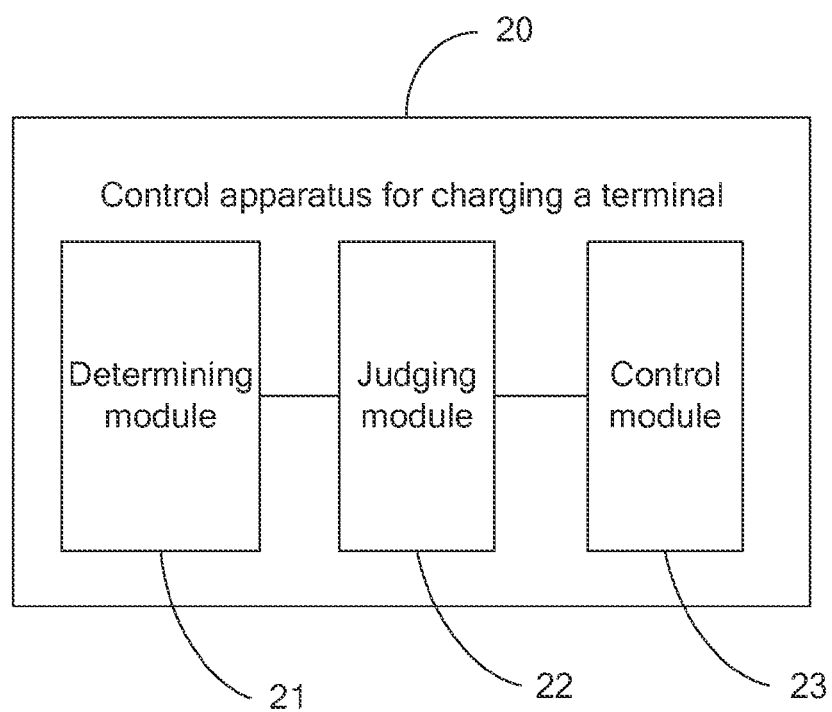
FIG. 3 shows a structural diagram of another embodiment of the control apparatus for charging a terminal of the present disclosure.

Furthermore, with reference to FIG. 3, another embodiment of the control apparatus for charging a terminal of the disclosure is disclosed, including: a determining module 21, a judging module 22 and a control module 23, wherein the judging module 22 and the control module 23 are respectively consistent with the functional modules with the same names in the embodiment above, which are not repeated here; and the determining module 21 is configured to determine that the terminal is connected with a charger. Namely, in the embodiment of the method, the control of switching-on or switching-off of the charging circuit of the terminal according to the current state of the terminal is implemented under the conditions that the terminal is connected with the charger and the charging is completed.

In the full-charged state of the terminal, when the terminal is determined to be in the operation state, the control module 23 in the embodiment controls the charging circuit of the terminal to be in the switching-on state to ensure the charger to continue to supply power to the terminal so as to fill up the electric energy consumed due to operation of the terminal, avoid the start of secondary charging caused by rapid power consumption when the terminal is in the operation state, and prolong the service life of a battery of the terminal; and when the terminal is determined to be in the standby state, the control module 23 controls the charging circuit of the terminal to be in the switching-off state so as to avoid a heating phenomenon of the terminal, which is generated when the charging circuit is switched on for a long time, save a great quantity of energy and improve the charging safety of the terminal.

Furthermore, in the embodiment of the control apparatus 20 for charging a terminal of the present disclosure, the operation state of the terminal includes one or a plurality of the following states: a game operation state, a telephone communication state, an Internet surfing operation state and a short message operation state, wherein the telephone communication state includes an outgoing call connection state, an outgoing call disconnection state, an incoming call connection state and an incoming call disconnection state; and the short message operation state includes a short message in editing state, a short message sending state, a short message receiving state and a short message reading state.

Furthermore, in the embodiment of the control apparatus 20 for charging a terminal of the present disclosure, the control module 23 is also configured to generate a charging circuit switching-on command and control the charging circuit of the terminal to be in the switching-on state according to the charging circuit switching-on command when the terminal is in the operation state.

The generated charging circuit switching-on command can be represented by a high level output through an IO port.

Furthermore, in the embodiment of the control apparatus for charging a terminal of the present disclosure, the control module 23 is also configured to generate a charging circuit switching-off command and control the charging circuit of the terminal to be in the switching-off state according to the charging circuit switching-off command when the terminal is in the standby state.

The generated charging circuit switching-off command can be represented by a low level output through an IO port.

In the embodiment, the judging module 22 can complete judging whether the terminal is in the operation state or the standby state by a state marker of each functional module and can make a judgment by the following two modes:

1, initializing the state marker of each functional module to "0", then inquiring about a current state of each functional module in the terminal and updating the state marker of each functional module; if a certain functional module is in the operation state, updating the state marker of the functional module to "1"; and if a certain functional module is in the idle state, keeping the state marker of the functional module as "0". If the state marker of one or a plurality of functional modules in the terminal is updated to "1", it represents that the terminal is in the operation state; and if the state markers of all the functional modules are kept "0", it represents that the terminal is in the standby state.

2, starting an interrupt function, initializing markers of all function-interrupt requests to "0", then inquiring about whether the terminal generates an interrupt request and updating markers of various function-interrupt requests; if a certain function-interrupt request is a service-initiate request, updating the marker of the function interrupt request to "1"; and if a certain function-interrupt request is a service-closing request, keeping in the marker of the function interrupt request as "0". If the marker of one or a plurality of function-interrupt requests in the interrupt requests are updated to "1", it represents that the terminal is in the operation state; and if the markers of all the function-interrupt requests in the interrupt requests are kept "0", it represents that the terminal is in the standby state.

The terminal can be a mobile terminal such as a mobile phone, a handheld television or the like.

It should be understood that the above are only the preferred embodiments of the present disclosure and cannot be intended to limit the patent scope of the disclosure; any equivalent structure transformations and equivalent process transformations made based on the contents of the descriptions and accompanying drawings of the present disclosure, or any direct or indirect application of the present disclosure in other related fields, shall fall within the scope of patent protection of the present disclosure.

The invention claimed is:

1. A control method for charging a terminal including a plurality of functional modules, each of the plurality of functional modules having a state marker or a marker of function-interrupt request, the method comprising steps of:
judging whether the terminal is in an operation state or a standby state when the terminal is in a full-charged state;
controlling a charging circuit of the terminal to be in a switching-on state when the terminal is in the operation state; and
controlling the charging circuit of the terminal to be in a switching-off state when the terminal is in the standby state;
wherein the step of judging whether the terminal is in an operation state or a standby state is completed by using the state markers of plurality of functional modules which comprising: initializing the state marker of each functional module to "0", then inquiring about a current state of each functional module in the terminal and updating the state marker of each functional module; if a certain functional module is in the operation state, updating the state marker of the functional module to "1"; and if a certain functional module is in an idle state, keeping the state marker of the functional module to "0"; If the sate marker of one or a plurality of functional modules in the terminal is updated to "1", it represents that the terminal is in the operation state; and if the state markers of all the functional modules are kept "0", it represents that the terminal is in the standby state; or
by using the markers of function-interrupt request of the plurality of functional modules which comprising: starting an interrupt function, initializing markers of all function-interrupt requests to "0", then inquiring about whether the terminal generates interrupt requests and updating the markers of various function-interrupt requests: if a certain function-interrupt request is a service-initiate request, updating the marker of the function-interrupt request to "1"; and if a certain function-interrupt request is a service-closing request, keeping the marker of the function-interrupt request "0"; If the marker of one or a plurality of function-interrupt requests in the interrupt request is updated to "1", it represents that the terminal is in the operation state: and if the markers of all the function-interrupt requests in the interrupt requests are kept "0", it represents that the terminal is in the standby state.

2. The control method for charging a terminal according to claim 1, wherein the operation state of the terminal includes one or a plurality of following states: a game operation state, a telephone communication state, an Internet surfing operation state and a short message operation state.

3. The control method for charging a terminal according to claim 1, wherein the step of controlling a charging circuit of the terminal to be in a switching-on state when the terminal is in the operation state is:
when the terminal is in the operation state, generating a charging circuit switching-on command and controlling the charging circuit of the terminal to be in the switching-on state according to the charging circuit switching-on command.

4. The control method for charging a terminal according to claim 1, wherein the step of controlling the charging circuit of the terminal to be in a switching-off state when the terminal is in the standby state is:
when the terminal is in the standby state, generating a charging circuit switching-off command and controlling the charging circuit of the terminal to be in the switching-off state according to the charging circuit switching-off command.

5. The control method for charging a terminal according to claim 2, wherein the step of controlling a charging circuit of the terminal to be in a switching-on state when the terminal is in the operation state is:
when the terminal is in the operation state, generating a charging circuit switching-on command and controlling the charging circuit of the terminal to be in the switching-on state according to the charging circuit switching-on command.

6. The control method for charging a terminal according to claim 2, wherein the step of controlling the charging circuit of the terminal to be in a switching-off state when the terminal is in the standby state is:
when the terminal is in the standby state, generating a charging circuit switching-off command and controlling the charging circuit of the terminal to be in the switching-off state according to the charging circuit switching-off command.

7. A control apparatus for charging a terminal including a plurality of functional modules, each of the plurality of functional modules having a state marker or a marker of function-interrupt request, the control apparatus comprising:
a judging module configured to judge whether the terminal is in an operation state or a standby state when the terminal is in a full-charged state;
a control module configured to control a charging circuit of the terminal to be in a switching-on state when the terminal is in the operation state and control the charging circuit of the terminal to be in a switching-off state when the terminal is in the standby state;
wherein the judging module judges whether the terminal is in an operation state or a standby state by using the state markers of plurality of functional modules which comprising: initializing the state marker of each functional module to "0", then inquiring about a current state of each functional module in the terminal and updating the state marker of each functional module; if a certain functional module is in the operation state, updating the state marker of the functional module to "1"; and if a certain functional module is in an idle state, keeping the state marker of the functional module to "0"; If the state marker of one or a plurality of functional modules in the terminal is updated to "1", it represents that the terminal is in the operation state; and if the state markers of all the functional modules are kept "0", it represents that the terminal is in the standby state; or
by using the markers of function-interrupt request of the plurality of functional modules which comprising: starting an interrupt function, initializing markers of all function-interrupt requests to "0", then inquiring about whether the terminal generates interrupt requests and updating the markers of various function-interrupt requests; if a certain function-interrupt request is a service-initiate request, updating the marker of the function-interrupt request to "1"; and if a certain function-interrupt request is a service-closing request, keeping the marker of the function-interrupt request as "0"; If the marker of one or a plurality of function-interrupt requests the interrupt requests is updated to "1", it represents that the terminal is in the operation state; and if the markers of all the function-interrupt requests in the interrupt requests are kept "0", it represents that the terminal is in the standby state.

8. The control apparatus for charging a terminal according to claim 7, wherein the operation state of the terminal includes one or a plurality of following states: a game operation state, a telephone communication state, an Internet surfing operation state and a short message operation state.

9. The control apparatus for charging a terminal according to claim 7, wherein the control module is further configured to generate a charging circuit switching-on command and control the charging circuit of the terminal to be in the switching-on state according to the charging circuit switching-on command when the terminal is in the operation state.

10. The control apparatus for charging a terminal according to claim 7, wherein the control module is further configured to generate a charging circuit switching-off command and control the charging circuit of the terminal to be in the switching-off state according to the charging circuit switching-off command when the terminal is in the standby state.

11. The control apparatus for charging a terminal according to claim 8, wherein the control module is further configured to generate a charging circuit switching-on command and control the charging circuit of the terminal to be in the switching-on state according to the charging circuit switching-on command when the terminal is in the operation state.

12. The control apparatus for charging a terminal according to claim 8, wherein the control module is further configured to generate a charging circuit switching-off command and control the charging circuit of the terminal to be in the switching-off state according to the charging circuit switching-off command when the terminal is in the standby state.

* * * * *